United States Patent [19]
Hendricks

[11] 3,898,526
[45] Aug. 5, 1975

[54] STATIC DISCHARGE APPARATUS AND SEVERAL METHODS FOR MANUFACTURING THE STATIC DISCHARGE APPARATUS

[76] Inventor: Charles D. Hendricks, 403 Sunnycrest Ct., Urbana, Ill. 61801

[22] Filed: Apr. 30, 1973

[21] Appl. No.: 355,930

Related U.S. Application Data

[63] Continuation-in-part of Ser. No. 148,619, June 1, 1971, abandoned.

[52] U.S. Cl. .................................. 317/2 E; 29/592
[51] Int. Cl. ............................... H01t ; B64d 45/02
[58] Field of Search ........ 317/2 E, 2 R, 2 F; 29/592

[56] References Cited
UNITED STATES PATENTS

| | | | |
|---|---|---|---|
| 2,732,517 | 1/1956 | Alabaster | 317/2 E |
| 3,034,020 | 5/1962 | Benkoczy et al. | 317/2 E |
| 3,617,805 | 11/1971 | Truax | 317/2 E |
| 3,767,971 | 10/1973 | Patrick, Jr. | 317/2 E |

Primary Examiner—L. T. Hix
Attorney, Agent, or Firm—Jack C. Berenzweig

[57] ABSTRACT

A static discharge apparatus comprising a rigid body including a discharge tip portion thereon. A plurality of resilient conducting whisker-like fibers are attached to the discharge tip portion and substantially cover the entire surface thereof.

30 Claims, 13 Drawing Figures

PATENTED AUG 5 1975 3,898,526
SHEET 1
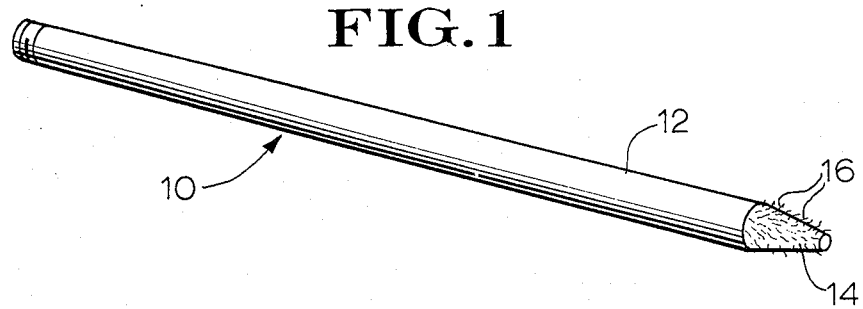
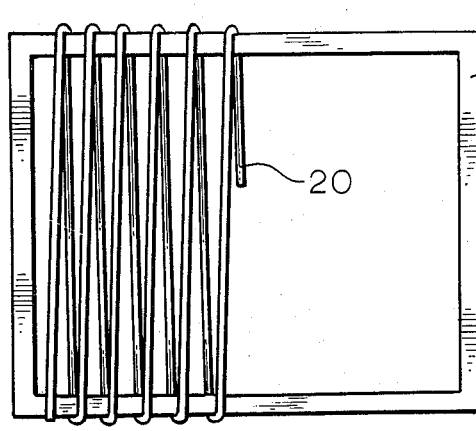
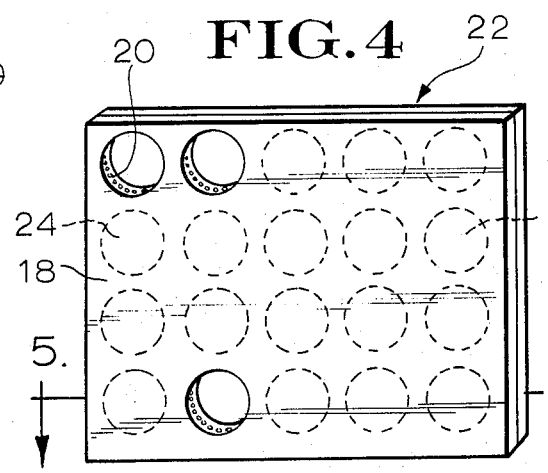
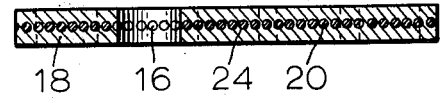
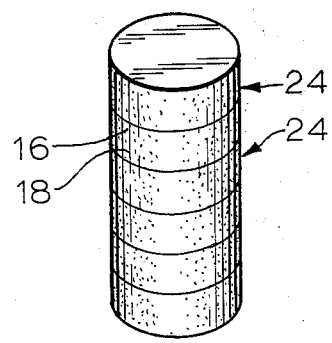
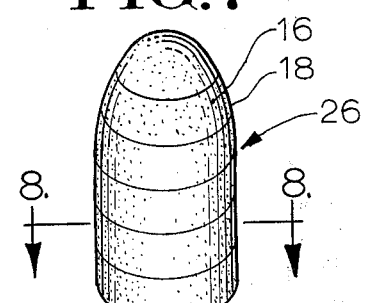
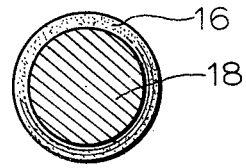
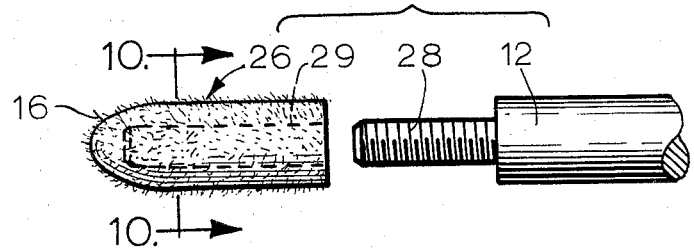
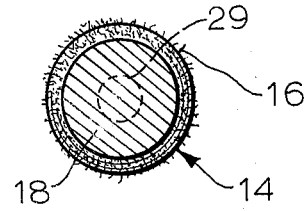

3,898,526

STATIC DISCHARGE APPARATUS AND SEVERAL METHODS FOR MANUFACTURING THE STATIC DISCHARGE APPARATUS

CROSS REFERENCE TO RELATED APPLICATIONS

This application is a continuation in part application of copending application Ser. No. 148,619, filed June 1, 1971, now abandoned for STATIC DISCHARGE APPARATUS AND SEVERAL METHODS FOR MANUFACTURING THE STATIC DISCHARGE APPARATUS.

BACKGROUND OF THE INVENTION

The present invention relates to static discharge devices and more particularly, to a novel, improved static discharge device, especially suitable for eliminating static interference in both subsonic and supersonic aircraft.

Aircraft static discharge leads to the production of radio frequency noise in communication and navigation equipment which are carried on board the aircraft. As the aircraft travels through the atmosphere, it is bombarded with particulate matter which is a normal part of the atmosphere at all altitudes. The particulate matter may be electrically charged and thus carry a charge to the aircraft. In addition, they may also charge the aircraft by tribo-electric effects as a result of the impact in relative motion of the particle and the aircraft surfaces which are in contact during and after the initial impact. As the aircraft becomes more and more highly charged during the flight, the electric field at the extremities of the aircraft surfaces, i.e., wing tips, tail surfaces, antenna, etc., may become large enough to cause corona discharge. The charge on the aircraft at the onset of corona may be large and, consequently, high current pulses may be present in the corona. These pulses give rise to radiated energy in the RF spectrum. To eliminate this, the modern aircraft usually carries some form of static discharge device placed at what are thought to be strategic locations, such as the trailing edge of the wings, tail section and stabilizer.

The success of a static discharge device which is attached to the aircraft depends on its capability of initiating a discharge or removing a charge from the aircraft at a rate low enough so that the currents involved do not produce radiation in the portion of the RF spectrum of interest for radar, communications, or navigation. Heretofore, three different types of static discharge devices have been utilized. The earliest static discharge device was manufactured of cotton or other organic fiber rope which was then impregnated with carbon particles. A second type of static discharge device was manufactured by utilizing a frayed metallic cable. The frayed ends of the metallic cable served the same purpose as the carbon which was impregnated in the cotton. Both the frayed metallic cable discharge device as well as the impregnated cotton discharge device performed relatively well for a low-speed propeller-driven aircraft. However, with the advent of high-speed aircraft, the lifetime for these two types of discharge devices became very short and it was thus necessary to develop a discharge device which was suitable for use in jet aircraft. One such static discharge device is commonly referred to as the cross-field type and utilizes two tungsten needles which are placed at the end of a rigid rod. The rod is then attached to the trailing surface of the aircraft wing in such a manner that the tungsten needles are perpendicular to this trailing surface. One such cross-field type discharge device is described in U.S. Pat. No. 3,170,087, issued Feb. 16, 1965, and assigned to Granger Associates. While this discharge device has proved satisfactory for use with jet aircraft, it has still had a relatively short lifetime because of erosion of the tungsten needles. In addition, it has been found that this type of static discharge device, when used on supersonic aircraft, only has a lifetime of a few minutes due to the speed of the aircraft and, therefore, it has been necessary to develop a static discharge device which will provide suitable service for both subsonic and supersonic aircraft. The present invention fulfills this need.

SUMMARY OF THE INVENTION

The general purpose of this invention is to provide a static discharge device which is adaptable for use in both subsonic and supersonic aircraft. To attain this, the present invention contemplates a unique static discharge device which comprises an elongated substantially rigid, rod-shaped body, having a first end adapted to be secured to the aircraft and a second end on which a discharge tip having a preselectable shape is located. The discharge tip has a plurality of resilient conducting whisker-like fibers attached to it wherein the whisker-like fibers substantially cover the entire surface of the discharge tip. Both the rod-shaped body and the discharge tip each have an operational conductivity in excess of $10^{-8}$ mohs per meter during periods of current flow when the discharger is operating. In addition, the present invention describes several novel methods for manufacturing such a discharge device.

An object of the present invention is the provision of a static discharge device which is adaptable for use in both subsonic and supersonic aircraft.

Another object is to provide a static discharge device which has a long life and is easily replaceable.

A further object is to provide a method for manufacturing a static discharge device which is adaptable for use in both subsonic and supersonic aircraft.

A still further object is the provision of a method for manufacturing a static discharge device which is economical and relatively simple.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a perspective view of a static discharge device which constitutes a first preferred embodiment of the invention.

FIGS. 2–10 are plan views of the steps of a first preferred method for manufacturing the static discharge device shown in FIG. 1.

DESCRIPTION OF THE PREFERRED EMBODIMENT

Figure 11:
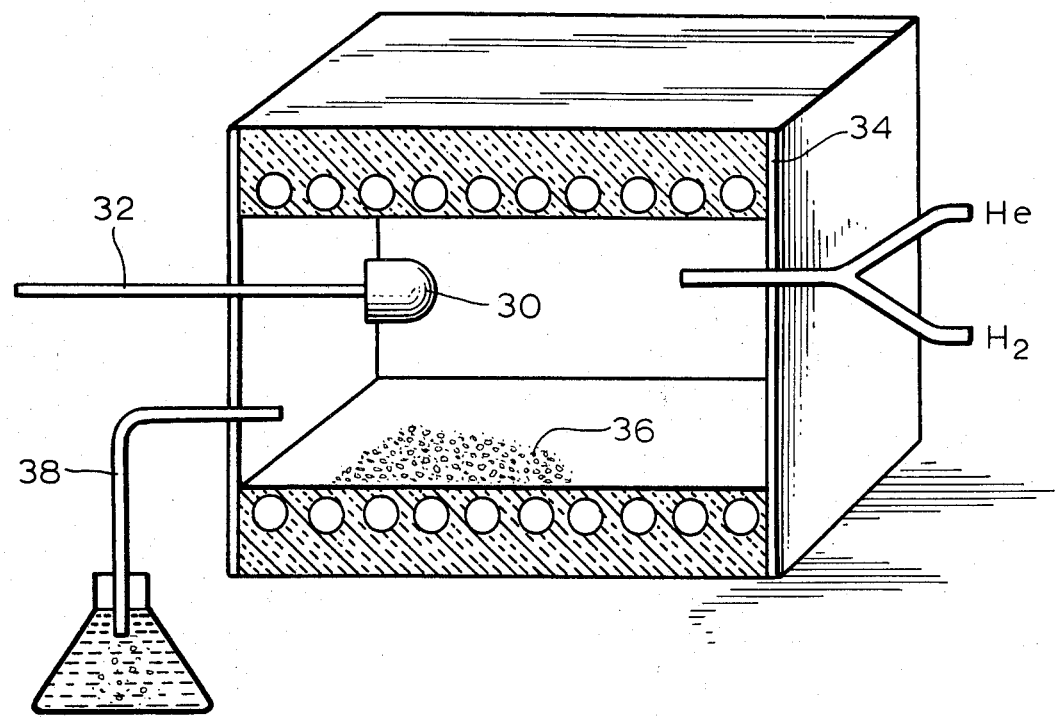
FIG. 11 is a plan view showing a second preferred method for manufacturing a static discharge device.

Referring now to the drawings wherein like reference characters designate like or corresponding parts throughout the several views, there is shown in FIG. 1, which illustrates a preferred embodiment of the invention, a static discharge device 10. The static discharge device 10 comprises a rigid body 12 and a static discharge tip portion 14 on one end thereof. As will be explained below, the static discharge tip portion 14 may comprise a portion of the body 12 or it may comprise a separate tip which is then connected to a rigid body. In the preferred embodiment, the body 12 may comprise a rigid rod-shaped conductive material such as metal or a rigid non-conductive material such as ceramic or epoxy filled fiberglass which is coated with a conductive substance. It will be recognized by one skilled in the art that a rigid body of any shape may be utilized but for best results the preferred embodiment utilizes an elongated shaped rigid body. A plurality of whisker-like conductive fibers 16 are attached to the static discharge tip 14. As will be explained below, the whisker-like conductive fibers 16 may either be embedded in the static discharge tip 14 or may be grown on the static discharge tip 14. The whisker-like conductive fibers 16 may be amorphous, polycrystalline or single crystals having a diameter of approximately 25 microns; however, the actual diameter is not critical and it may be either larger or smaller. The length of the whisker-like conductive fibers 16 may be several millimeters or shorter. The static discharge tip 14 may be manufactured separately and then attached to the rigid body 12 or it may be manufactured as an integral part of the rigid body 12.

The present invention contemplates several different methods for manufacturing the static discharge device 10. FIGS. 2–10 show the steps of one method for manufacturing the static discharge device 10. In this method, whisker-like conductive fibers 16 are embedded into the static discharge tip 14 in a preselected orientation. In order to accomplish this, a matrix material 18 is selected. In one preferred embodiment, the matrix material 18 may comprise a conductive plastic such as a mixture of fluorinated hydrocarbon (Teflon) and carbon or any other similar conductive material; however, a highly resistive or non-conductive material with similar physical properties may also be utilized. One such highly resistive material may comprise a mixture of fluorinated hydrocarbon (Teflon) and fiberglass. A wire material 20 is then wrapped around a frame 19 so as to form two non-overlapping layers of fibers in a manner shown in FIG. 2. The wire material 20 should have the following properties: a high body strength; a high modulus of elasticity; conductivity greater than $10^{-8}$ mohs per meter or in other words, a resistivity less than $10^8$ ohm meters; a high melting point, and a low chemical reactivity. In the preferred embodiment, tungsten wire is utilized; however, the following wires may also be utilized: molybdenum; tantalum; copper; silicon and silver. After wrapping the wire material 20 around the frame 19 in the manner shown in FIG. 2, the wire material is enclosed on each side by a sheet or layer of matrix material 18 thereby forming a sandwich structure 22. The sandwich structure 22 as shown in FIG. 3 comprises a layer of the matrix material 18 on either side of the layer of wire material 20.

An alternative method of constructing a sandwich of matrix material and wire may also be utilized. In this alternative method, the wire material is wrapped around the matrix material thereby forming a sandwich having a center core of matrix material with a layer of wire material formed on either side thereof. Regardless of which method is utilized to manufacture the sandwich, the remaining steps in the manufacture of the static discharge device remains the same.

The sandwich structure 22 is then placed in a press or other similar apparatus and is compressed such that the wire material 20 becomes embedded in the matrix material 18. In a typical thickness, the matrix material 18 with the embedded wire material 20 might be approximately 1/16 of an inch. Following the production of the compressed sandwich 22, the sandwich 22 is then placed in a punch machine or similar apparatus. Small discs 24 are then punched from the sandwich 22 such as that shown in FIGS. 4 and 5. The diameter of the discs is made such that it will be approximately equal to the diameter of the body 12 of the static discharge device 10. Each of the discs 24 comprise a portion of the matrix material 18 having strands of the wire material 20 embedded therein. A plurality of these discs are then stacked together as shown in FIG. 6. They are stacked to a height equivalent to the total length of the static discharge tip 14. The discs are then compressed in a mold in order to form a unitary tip structure 26.

Next, a mounting hole 28 is drilled in one end of the tip structure 26. This mounting hole enables the tip structure 26 to be mounted on the body 12 when it is completed. The opposite end of the tip structure 26 is then machined to provide a taper conforming to the desired taper of the static discharge tip 14. This is shown in FIG. 7. Any suitable machining process may be utilized in order that both the matrix material 18 and the wire material 20 are machined away. FIG. 8, which is a cross-section of FIG. 7, shows the tip structure 26 still comprises a matrix material having wire embedded therein.

After this first machining step is accomplished, a second machining step is utilized to solely remove portions of the matrix material and thereby expose the whiskers on the surface of the tip structure 26. This may be accomplished by utilizing a brush which will remove the softer matrix material 18 but will not remove the wire material 20. The machined tip structure 26 then becomes the finished static discharge tip 14 as shown in FIGS. 9 and 10 having whisker-like conductive fibers 16 embedded in its surface. It is clear from this manufacturing step that whisker-like conductive fibers 16 are merely the exposed ends of the wire material 20 which had been embedded in the matrix material 18. Lastly, the static discharge tip 14 may be mounted on the body 12 in any suitable manner to form an integral static discharge device 10 as shown in FIG. 1. One such mounting means is shown in FIG. 9 and comprises the use of a conductive member such as a threaded stud 28 which is electrically connected to the conductive portion of the body 12. A suitable aperture 29 is machined in the interior of discharge tip structure 26. The discharge tip structure 26 is placed over the threaded stud 28 thereby electrically connecting one end of the whisker-like conductive fibers 16 to the conductive body 12 and forming the discharge tip 14 of the static discharge device 10 shown in FIG. 1.

It will also be recognized that the shape of the discharge tip structure 26 may be modified for other purposes. For example, the discharge tip structure 26 may comprise a flat laminate sheet which may be affixed to any object, such as a shoe, and will function as a static discharger or static eluminator.

As mentioned above, the body 12 of the static discharge device 10 should be rigid and should have an operational conductivity in excess of $10^{-8}$ mohs per meter (or in other words, a resistivity less than $10^8$ ohm meters) during periods of current flow when the discharger is operating. To attain this, the body 12 may be made from a solid conductive material or it may comprise an inner core of non-conductive material such as ceramic or epoxy filled fiberglass which is then coated with a conductive substance. The body 12 may then be placed within a protective non-conductive sleeve (not shown). The non-conductive sleeve may be manufactured from fluorinated hydrocarbon (Teflon) or any other suitable material and serves to protect the body 12 from electrical erosion.

It will be noted that the whisker-like conductive fibers 16 are arranged along the surface of the static discharge tip 14 in a pre-oriented manner since the orientation is controlled by the means in which the wire material 20 is wrapped around the matrix material 18 as shown in FIG. 2. It is also possible to form a static discharge tip having whisker-like conductive fibers embedded therein in a non-uniform orientation. This may be accomplished by first cutting suitable small lengths of wire material and mixing them together with a powdered conducting plastic material such that they are essentially distributed throughout the entire material. This mixture may then be compressed by any suitable means to form a composite body. After this composite body is formed, the shape of the tip would then be machined in a manner similar to that described above in reference to FIGS. 6-10.

A third method for manufacturing the static discharge tip 14 comprises the steps of manufacturing a tip structure from any matrix-like material which would have a conductivity greater than $10^{-8}$ mohs per meter in operation. One such matrix material may be a conductive fluorinated hydrocarbon (Teflon) and carbon mixture. The tip structure is machined or molded in a preselectable shape conforming with the desired shape of the completed static discharge device. The matrix material is then coated with any adhesive substance and is then suspended over a plurality of whisker-like conductive particles. These particles may be manufactured from any of the materials mentioned above with reference to FIGS. 2-6. Lastly, a high voltage is applied between the matrix material and the whisker-like particles, whereby the whisker-like particles are attracted to the matrix material thereby forming the completed static discharge tip 14 having whisker-like particles 16 attached to the outer surface thereof.

A fourth method of manufacturing a static discharge tip is through the use of a process known as crystalline whisker growth. The growth of whiskers through the use of the reduction of metal salts is well known in the art. A complete description of whisker growth may be formed in ACTA Metallurgica Volume 4, January, 1956, pp. 62-74, and Soviet Physics Uspekhi, Volume 67 (2), No. 2, March-April, 1959, pp. 282-304.

Referring now to FIG. 11, the manufacture of a static discharge tip 14 through the use of whisker growth will be described. First, a suitably shaped tip structure 30 is manufactured by any suitable machining means. The tip structure 30 may comprise a conductive material such as conductive teflon or may comprise a non-conductive material, such as ceramic, or a non-conductive material which is coated with a conductive material. Suitable materials for the tip may comprise aluminum oxide or any other ceramic, conductive plastic, copper, stainless steel, tungsten or molybdenum. The tip structure 30 is then mounted on a holder 32 and is inserted into a furnace 34. Also placed into the furnace is a halogen compound 36 of the desired whisker material. If it is desired to have copper whiskers, then the halogen compound 36 would comprise a copper compound such as copper chloride or copper bromide. Several whisker materials may be grown. In the preferred embodiment, the whisker material must be conductive and must have the chemical characteristics such that it does not corrode easily, does not melt easily and has a high tensile strength. Tungsten and copper are the most preferable materials while semiconductive materials such as silicon may also be utilized.

Figure 12:
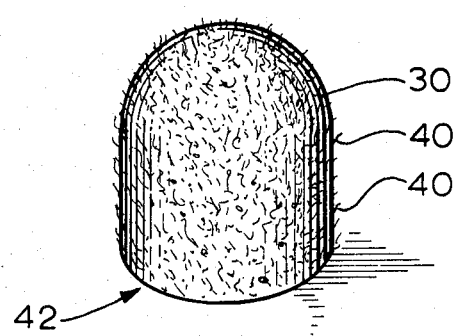
FIG. 12 is a plan view of an alternative preferred embodiment of the invention.

After the tip structure 30 and the compound 36 are placed in the furnace, as shown in FIG. 11, hydrogen and helium are introduced into the furnace, driving out the residual air through an exhaust tube 38. After the residual air is driven out and replaced by a mixture of helium and hydrogen, the furnace 34 is heated to a suitable temperature which, in the case of a whisker material such as copper, may be approximately 650° C. At this temperature, the halide compound 36 reacts with the gaseous mixture resulting in the liberation of atoms in the metal contained in the halide compound. This metal then deposits on the tip structure 30 in the form of whisker-like conductive crystals 40 thereby forming a static discharge tip 42 as shown in FIG. 12.

Figure 13:
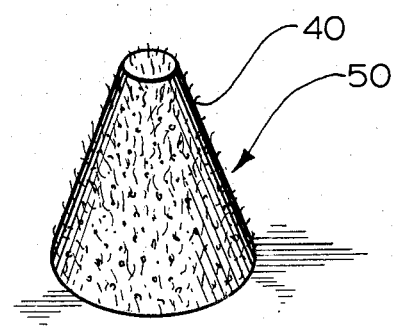
FIG. 13 is a plan view of still another preferred embodiment of the invention.

FIG. 13 discloses a static discharge tip 50 which is similar to the static discharge tip 42 except that the shape of the tip differs slightly. It will be recognized by one skilled in the art that the actual shape of the tip is not critical to the practice of the invention. After the static discharge tip 42 or 50 is manufactured, it is then mounted in any suitable manner to the body 12, as shown in FIG. 1, thereby forming the static discharge device 10.

Regardless of which method is utilized to manufacture the static discharge tip 14, 42 or 50, the body 12 of the static discharge device 10 in the preferred embodiment should be approximately ⅜ inch diameter and 6-8 inch in length. The body 12 in the preferred embodiment has a resistance from one end to the other in the range of 10-200 meg ohms. In this manner, the static discharge device 10 provides the desired results. Because the body 12 is rigid and because the whisker-like conductive fibers 16 or whisker-like conductive crystals are flexible, a static discharge device 10 made in accordance with the preferred embodiment of the invention is suitable for use in both supersonic and subsonic aircraft and has a long life. In the event that the static discharge tip 14 or 42 or 50 requires replacement, it is a simple matter of merely replacing the tip and leaving the body 12 mounted on the aircraft.

In actual use, the conductive body 12 transfers the accumulated static electricity from the aircraft surface to the static discharge tip 14, 42 or 50 while controlling the rate at which the charge transfer takes place. The matrix material 18 of the static discharge tip 14, or the body material 30 of the static discharge tips 42 or 50, transfers the accumulated static electricity from the body 14 to the whisker-like conductive fibers 16 or conductive crystals 40. The whisker-like conductive fibers 16 or conductive crystals 40 discharge the static electricity at controlled levels of current by providing a multitude of discharge paths ending in extremely small discharge point radii thereby eliminating radio frequency interference.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A method for manufacturing a static discharge means comprising the steps of:
   impregnating a matrix material with a plurality of whisker-like conductive particles wherein said whisker-like conductive particles are oriented in a manner such that they extend substantially radially from said matrix material thereby forming a composite material;
   removing a portion of said composite material whereby said composite material is conformed to a preselected shape whereby said whisker-like conductive particles extend substantially radially; and
   exposing a plurality of ends of said whisker-like particles by removing a portion of said matrix material thereby forming said static discharge means.

2. The method of claim 1 wherein said matrix material has an operational conductivity greater than approximately $10^{-8}$ mohs per meter.

3. The method of claim 1 wherein said matrix material is coated with a conductive layer having an operational conductivity greater than approximately $10^{-8}$ mohs per meter.

4. A method for manufacturing a static discharge means comprising the steps of:
   forming a flat layer of a matrix material;
   wrapping conductive wire around a frame structure;
   placing a layer of matrix material on each side of said wrapped frame to form a sandwich-like structure having two outer layers of said matrix material and an inner layer of conductive wire;
   compressing said sandwich to form a single composite material wherein said conductive wire is embedded into said matrix material;
   disecting said composite material into a plurality of composite segments with whisker-like conductive particles embedded therein;
   stacking a plurality of said composite segments;
   compressing said stack of composite segments to form a unitary structure;
   removing a portion of said composite material of said unitary structure whereby said unitary structure is conformed to a preselected shape; and
   exposing a plurality of ends of said whisker-like conductive particles by removing a portion of said matrix material thereby forming said static discharge means.

5. The method of claim 4 wherein said composite material is removed to form said preselected shape by machining.

6. The method of claim 5 wherein said matrix material is removed by a wire brush.

7. The method of claim 4 wherein said conductive coating comprises fluorinated hydrocarbon.

8. The method of claim 4 wherein said matrix material has a conductivity greater than approximately $10^{-8}$ mohs per meter.

9. The method of claim 8 wherein said matrix material has a high melting point, a high modulus of elasticity, a high body strength and a low chemical reactivity.

10. The method of claim 9 wherein said conductive wire has a high melting point and a high modulus of elasticity.

11. The method of claim 9 wherein said conductive wire is selected from the group consisting of tungsten, molybdenum, tantalum, copper, silicon or silver.

12. The method of claim 11 further comprising the step of connecting said static discharge means to one end of a rigid elongated body, said body being adaptable for connection to an aircraft.

13. A method for manufacturing a static discharge means comprising the steps of:
   mixing a powdered conductive matrix material with a plurality of whisker-like conductive particles;
   compressing and sintering said mixture to form a unitary structure of composite material wherein said whisker-like conductive particles are oriented in a manner such that they extend substantially radially from said composite material;
   removing a portion of said composite material to conform said unitary structure to a preselected shape whereby said whisker-like conductive particles extend substantially radially;
   and
   exposing a plurality of ends of said whisker-like conductive particles thereby forming said static discharge means.

14. The method of claim 13 further comprising the step of connecting said static discharge means to one end of a rigid body, said body being adaptable for connection to an aircraft.

15. A method for manufacturing a static discharge means comprising the steps of:
   forming a matrix material having a preselected shape, said matrix material having an operational conductivity greater than approximately $10^{-8}$ mohs per meter;
   coating said matrix material with an adhesive-like substance;
   suspending said matrix material over a plurality of whisker-like conductive particles; and
   applying a high voltage between said matrix material and said whisker-like particles, whereby said whisker-like particles are attracted to said matrix material thereby-forming said static discharge means.

16. The method of claim 15 further comprising the step of connecting said static discharge means to one end of a rigid body, said body being adaptable for connection to an aircraft.

17. A method for manufacturing a static discharge means comprising the steps of:
   forming a discharge tip from a rigid material having a preselectable shape;
   placing said discharge tip in proximity with a compound of said rigid material;
   introducing a mixture of gases in said proximity;

heating said mixture of gases, said discharge tip and said compound whereby said compound reacts with said gaseous mixture and causes a whisker-like crystalline material to be deposited on said discharge tip; and connecting said whisker-like coated discharge tip to one end of a rod-shaped device thereby forming said static discharge means.

18. The method of claim 17 wherein said rigid material comprises copper and wherein said compound comprises a copper halogen compound.

19. The method of claim 18 wherein said gaseous mixture comprises hydrogen and helium.

20. The method of claim 19 wherein said gaseous mixture, said copper halogen compound and said copper are heated to approximately 650° C.

21. The method of claim 17 wherein said rigid material is conductive and is selected from the group consisting of copper, stainless steel, tungsten or molybdenum.

22. The method of claim 17 wherein said rigid material is non-conductive and is coated with a conducting substance.

23. A method for manufacturing a static discharge means comprising the steps of:

forming a flat layer of a matrix material;

wrapping conductive wire around both surfaces of said layer of matrix material to form a sandwich-like structure having two outer layers of said conductive wire and an inner layer of matrix material;

compressing said sandwich to form a single composite material wherein said conductive wire is embedded into said matrix material;

dissecting said composite material into a plurality of composite segments with whisker-like conductive particles embedded therein;

stacking a plurality of said composite segments;

compressing said stack of composite segments to form a unitary structure;

removing a portion of said composite material of said unitary structure whereby said unitary structure is conformed to a preselected shape; and exposing a plurality of ends of said whisker-like conductive particles by removing a portion of said matrix material thereby forming said static discharge means.

24. A static discharge device for use on a high speed aircraft comprising:

a body adapted to be secured to said aircraft wherein said body comprises a rigid material having an operational conductivity in excess of $10^{-8}$ mohs per meter;

a discharge tip located on said body; and a plurality of conducting whisker-like fibers substantially radially embedded in said discharge tip wherein each of said whisker-like fibers is physically spaced apart from each of said other whisker-like fibers in said discharge tip and wherein a plurality of the ends of said whisker-like fibers extend beyond the surface of said discharge tip.

25. The static discharge device of claim 24 wherein said conductive whisker-like fibers have a high melting point and a high modulus of elasticity.

26. A static discharge device for use on a high speed aircraft comprising:

a body adapted to be secured to said aircraft wherein said body comprises an inner core of substantially non-conductive rigid material and an outer layer of conductive material;

a discharge tip located on said body; and a plurality of conducting whisker-like fibers substantially radially embedded in said discharge tip wherein each of said whisker-like fibers is physically spaced apart from each of said other whisker-like fibers in said discharge tip and wherein a plurality of the ends of said whisker-like fibers extend beyond the surface of said discharge tip.

27. The static discharge device of claim 26 wherein said conductive whisker-like fibers have a high melting point and a high modulus of elasticity.

28. The static discharge device of claim 26 wherein said discharge tip and said body are detachably connected.

29. The static discharge device of claim 26 wherein said discharge tip comprises a rigid material having a conductivity in excess of $10^{-8}$ mohs per meter and said whisker-like fibers comprise tungsten.

30. A static discharge device for use on a high speed aircraft comprising:

an elongated, substantially rigid body adapted to be secured to said aircraft, said body having an operational conductivity in excess of $10^{-8}$ mohs per meter;

a discharge tip connected to said body, said discharge tip having an operational conductivity in excess of $10^{-8}$ mohs per meter; and a plurality of resilient conducting whisker-like fibers substantially radially embedded in said discharge tip wherein said fibers substantially cover the entire surface of said discharge tip but wherein each of said fibers are physically spaced apart from each of said other fibers in said discharge tip and wherein a plurality of the ends of said whisker-like fibers extend beyond the surface of said discharge tip.

* * * * *